Patented Apr. 8, 1941

2,237,374

UNITED STATES PATENT OFFICE 2,237,374

PAPER FILLER

Allan K. Smith, Appleton, Wis., assignor to The Institute of Paper Chemistry, Appleton, Wis., a corporation of Wisconsin No Drawing. Application July 11, 1936, Serial No. 90,255

10 Claims. (Cl. 134—58)

This invention relates to improved paper fillers or pigments and the method of making the same.

Paper fillers employed heretofore such as clay, titanium dioxide and the like have not been found entirely satisfactory for use in all types of paper, particularly a paper having high brightness and low cost. For example, to obtain a paper having a high brightness or whiteness necessitates the use of high cost fillers, while the use of low cost fillers is accompanied by a corresponding lowering of brightness. The paper industry has long sought a filler having a high brightness and high opacity combined with a low cost.

It is an object of my invention to provide an inorganic paper filler having a high brightness and a high opacity.

It is also an object of my invention to provide a paper filler having a low cost.

Further objects of my invention will be apparent as the description hereinafter proceeds.

I have discovered that an improved paper filler having the advantages enumerated above may be prepared by mixing an aqueous solution of an alkali silicate with an aqueous solution of a metal salt, the metal of the salt being selected from the group of metals capable of forming white oxides in the presence of dilute alkaline solutions, neutralizing the mixture with an acid or acidic material, washing the precipitate thus formed to remove soluble salts therefrom and drying the precipitate.

My invention includes the use of water soluble silicates, although the use of the alkali silicates containing a high percentage of alkali silicate, i. e. sodium silicate and potassium silicate, are preferred. My invention also includes the use of any water soluble salt, the metal of which is capable of forming a white oxide in presence of dilute alkaline solutions. Metals such as zinc, titanium, barium, magnesium, aluminum and calcium have been found particularly adaptable. It is preferred to use the soluble chlorides and sulphates of the above salts although any water-soluble combination of the metal may be employed. The acid or acidic material added to the silicate and metal salt solution is preferably sulphuric acid, although my invention includes the use of hydrochloric acid, alum and the like.

The gelatinous precipitate formed on addition of the acid should be washed with water to remove soluble salts formed during the reaction. The presence of soluble salts in the filler have been found deleterious.

Although it is possible to use the precipitate without drying, the best results are obtained when the precipitate is moderately dried or calcined at a temperature below 600° C. for a period of about 30 to 60 minutes. The metal of the metal salt before drying is slightly soluble. During drying the precipitate undergoes some change as the dried material is substantially insoluble under paper making conditions. The drying temperature should not go beyond 600° C. as high temperatures cause the material to increase in abrasiveness. The precipitate after drying should be ground to the size desired.

The following preferred example in which the parts are by volume will serve to illustrate my invention.

One part of sodium silicate is diluted with two parts of water and while stirring vigorously one part of a 10 percent water solution of zinc chloride is added. The solution is stirred for some time in order to insure a complete mixture of the salts and then sufficient sulphuric acid is added to neutralize the solution. The gelatinous precipitate which gradually forms is washed with water to free it from soluble salts formed during the reaction. The precipitate is next dried preferably at a temperature around 500° C. for 30 to 60 minutes and then ground in the usual manner to a fine state of subdivision. The drying of the precipitate greatly reduces the solubility of the zinc complex under acid paper making conditions.

It will be understood that the ingredients used in the above illustrative example may be replaced by equivalent materials. For example, a silicate such as potassium silicate may be used in place of sodium silicate; the zinc chloride may be replaced in part or in whole by soluble salts or mixtures thereof of metals such as barium, titanium, magnesium, aluminum and calcium; and the sulphuric acid may be replaced by acid materials such as hydrochloric acid, alum and the like. It will be also understood that my invention is not limited to the exact proportions of ingredients described above. For example, the quantity of metal salt, i. e. zinc chloride, may be varied within wide limits. It is possible to use one-half part of a 20 percent solution, or the total amount of zinc chloride may be reduced by 30 percent without a substantial change in the properties of the precipitate. Although a larger amount of zinc chloride may also be used, a larger amount has been found not to improve the final product.

The chemical action which takes place during the formation of the filler and formula of the final product are not known. It is possible that a silica gel, a metallic oxide and some metallic (zinc) silicate are formed. The change in the composition or complex on drying is not understood. The filler also undergoes some change during aging. This rearrangement in the molecules of the complex is also not understood although my investigations indicate that the complex may contain some silica gel.

My improved filler or pigment may be used with other fillers or used by itself as desired. It has a brightness of nearly 100 percent using magnesium carbonate as a standard, and has an opacity, rated on a cost basis, greatly in excess of the expensive fillers such as titanium dioxide.

The following furnish containing only 2 percent of my improved filler produces an excellent bond paper, which may be subsequently starch sized.

| | Percent |
|---|---|
| Virgin rag | 19 |
| Bleached kraft pulp | 15 |
| Bleached sulphite pulp | 45 |
| Broke (paper trimmings, etc., 25 to 50 percent rag) | 21 |

To the above is added:

| | Percent |
|---|---|
| Rosin size | 1.2 |
| Alum | 3.4 |
| Filler | 2.0 |

The bond paper containing 2 percent filler prepared from the furnish described above gave the following results:

Table

| | Filler | Opacity | Brightness | Tear (16 sheets) across | Fold across |
|---|---|---|---|---|---|
| 1 | Sodium silicate-barium chloride - sulphuric acid complex | 85.3 | 78.3 | 78.4 | 174 |
| 2 | Sodium silicate-zinc chloride - sulphuric acid complex | 86.3 | 78.6 | 76 | 243 |

My improved fillers not only have a high brightness and a high opacity but in addition have an extremely low cost making their use in large amounts economical. Paper made employing my novel filler also has excellent tear and fold properties.

While I have illustrated my invention showing certain preferred embodiments thereof, it will be understood that my invention is not limited thereto. All modifications coming within the true spirit and scope of my invention are intended to be covered by the claims appended hereto.

I claim:

1. A method of making a filler for use in the paper industry which comprises mixing an aqueous solution of an alkali silicate with an aqueous solution of a soluble metal salt, the metal of said salt being selected from the group of metals forming white oxides in the presence of dilute alkaline solutions, neutralizing the mixture with an acidic material, washing the precipitate thus formed to remove soluble salts and drying said precipitate.

2. A method of making a filler for use in the paper industry which comprises mixing an aqueous solution containing an alkali silicate with an aqueous solution containing a soluble zinc salt, neutralizing the mixture with an acid, washing the precipitate thus formed to remove soluble salts, and drying said precipitate.

3. A method of making a filler for use in the paper industry which comprises mixing an aqueous solution containing an alkali silicate with an aqueous solution containing a soluble barium salt, neutralizing the mixture with an acid, washing the precipitate thus formed to remove soluble salts, and drying said precipitate.

4. A method of making a filler for use in the paper industry which comprises mixing an aqueous solution containing sodium silicate with an aqueous solution containing barium chloride, neutralizing the reaction mixture with sulphuric acid, washing the precipitate thus formed with water to remove soluble salts, and drying said precipitate at a temperature of about 500° C.

5. A method of making a paper filler which comprises stirring a solution containing about one part of sodium silicate in about two parts of water with about one part of an aqueous solution containing about 10 percent zinc chloride, neutralizing the reaction mixture with sulphuric acid, washing the precipitate thus formed with water to remove soluble salts and drying said precipitate at a temperature of about 500° C.

6. As a new composition of matter, a paper filler prepared in accordance with the process described in claim 1.

7. As a new composition of matter, a paper filler prepared in accordance with the process described in claim 2.

8. As a new composition of matter, a paper filler prepared in accordance with the process described in claim 3.

9. As a new composition of matter, a paper filler prepared in accordance with the process described in claim 4.

10. As a new composition of matter, a paper filler prepared in accordance with the process described in claim 5.

ALLAN K. SMITH.